United States Patent [19]

Dangschat

[11] Patent Number: 4,945,463
[45] Date of Patent: Jul. 31, 1990

[54] SWITCHED POWER PACK WITH PROTECTIVE DEVICE FOR LIMITING OUTPUT VOLTAGE

[75] Inventor: Rainer Dangschat, Landsham, Fed. Rep. of Germany

[73] Assignee: Siemens Aktiengesellschaft, Berlin and Munich, Fed. Rep. of Germany

[21] Appl. No.: 367,201

[22] Filed: Jun. 16, 1989

[30] Foreign Application Priority Data

Jun. 16, 1988 [DE] Fed. Rep. of Germany ....... 3820558

[51] Int. Cl.⁵ ............................................ H02M 3/335
[52] U.S. Cl. ........................................ 363/56; 363/21; 363/97
[58] Field of Search ......................... 363/20, 21, 56, 97; 315/411; 358/190

[56] References Cited

U.S. PATENT DOCUMENTS

| | | | |
|---|---|---|---|
| 4,389,702 | 6/1983 | Clemente et al. | 363/56 |
| 4,686,617 | 8/1987 | Colton | 363/56 |
| 4,737,853 | 4/1988 | Graves et al. | 358/190 |
| 4,739,462 | 4/1988 | Farnsworth et al. | 363/21 |

FOREIGN PATENT DOCUMENTS 3341074 5/1985 Fed. Rep. of Germany .

Primary Examiner—Peter S. Wong
Attorney, Agent, or Firm—Hill, Van Santen, Steadman & Simpson

[57] ABSTRACT

A switched power pack with a protective device for limiting output voltage such as in television receivers includes an avalanche-proof MOS transistor as the switching transistor in the switched power pack. The switched power pack is dimensioned so that a voltage safety margin of 10 through 20% is provided between the reliable continuous operation of the switched power pack and the destruction limit of the MOS transistor so that in the case of malfunction the output voltage of the switched power pack cannot rise to such an extent that the allowable high voltage level of the picture tube is exceeded and thereby emit dangerously high levels of x-radiation.

4 Claims, 3 Drawing Sheets

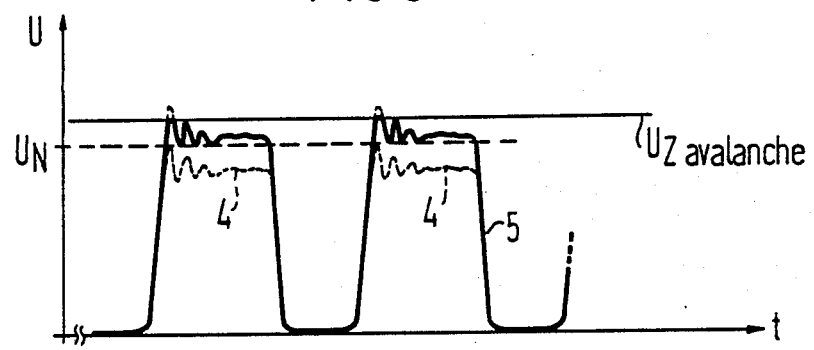
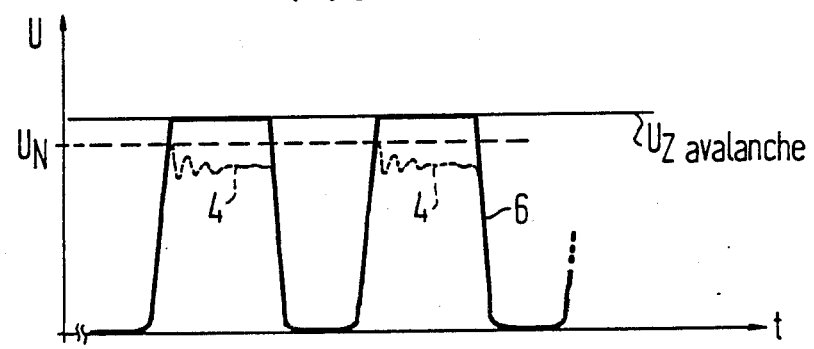

SWITCHED POWER PACK WITH PROTECTIVE DEVICE FOR LIMITING OUTPUT VOLTAGE

BACKGROUND OF THE INVENTION

1. Field of the Invention

The present invention is directed generally to a switched power pack with a protective device for limiting output voltage and, more particularly, to a device including a drive means for driving a switching transistor with which a DC-voltage is periodically connected to a primary winding of a transformer, whereby the transformer has at least one secondary winding at which the output voltage is taken via a rectifier means.

2. Description of the Related Art

A circuit arrangement for a switched power pack is disclosed in German Published Application No. 33 41 074 A1. For protection against excessively high-voltage at the secondary side of the switched power pack, a thyristor is provided which periodically inhibits the switching transistor when excessively high current is present at the primary side.

It is known to stabilize the output voltage of switched power packs with a control loop. For example, in Siemens Produkinformation "ICs Fuer Die Unterhaltungselektronik, SNTs", Edition of August '87 is disclosed the acquisition of the output quantity or the deviation occurring via a control winding at the transformer of the switched power pack. This can also occur by the use of an opto-coupler. The switching transistor is driven dependent on the identified output quantity or deviation via a control and monitoring means.

When the control loop malfunctions in the known circuit arrangements, however, then the output voltage of the switched power pack can rise to unacceptable values. Given a rise of the output voltage of from 20 through 40%, the signal processing stages of the control and monitoring means remains functional since their supply voltages are usually re-stabilized. In other words, the supply voltage is regulated to stay within acceptable limits so that the device continues to operate.

This presents a particular problem when the switched power pack is used as a power supply for television sets or other picture tube devices. When, in particular, the non-stabilized supply voltage of the horizontal sweep circuit (H-sweep) rises by this percentage, then the high-voltage at the picture tube of the television set also rises in the same ratio, for example, from 25 to 35 kv. The television picture may seen slightly enlarged but remains sharp to the observer, so that the set usually continues to be used. However, the acceptable limit values of x-rays emitted by the television set are dangerously exceeded. The x-ray regulations in some individual countries, therefore, prescribe reliable circuits which prevent the increase of the high-voltage at the picture tube of the television set. For example, in the Federal Republic of Germany, the limit value of admissible x-radiation from a television set lies at 30 kv.

The main problem lies in that then bipolar transistors are usually employed in the switched power packs and horizontal sweep circuits of the line output stage, which exhibits a very large safety margin in the dielectric strength. For example, a bipolar transistor BU 508 is used in switched power packs and is operated with about 700 volts, and in a 90° line output stage is operated with about 950 volts. The limiting data for the bipolar transistor BU 508 is 1500 volts and the destruction limit lies at about 1700 through 1800 volts, which means that the output stages almost never fail due to over-voltage. Instead, when a malfunction occurs which affects the control voltage, dangerously high output voltages are generated by the power pack and, thus, excessively high voltages at the picture tube and resulting dangerously high x-radiation levels occur.

SUMMARY OF THE INVENTION

An object of the invention is to provide a circuit arrangement for a switched power pack with which an unacceptable rise in the output voltage is readily avoided with the least possible expense.

This and other objects of the invention are achieved in that the switching transistor in the present switched power pack is an avalanche-proof MOS transistor, whereby the switched power pack is dimensioned so that a voltage safety margin of 5% through 20% is provided between the reliable continuous operation of the switched power pack and the destruction limit of the avalanche-proof MOS transistor.

Through the use of the switched power pack of the present invention, the operational reliability of a switched power pack is higher than or at least equal to a switched power pack that uses a bipolar transistor having a 100% voltage safety margin or that uses a MOS transistor with a 40% voltage safety margin.

One-time, extremely high reverse (or blocking) voltage peaks can occur in the switched power pack due to external influences such as, for example, picture tube arc-overs, lightning-induced over-voltages, or synchronization malfunctions in the switched power pack. The present invention utilizes the fact that these reverse voltage peaks are harmless to avalanche-proof MOS transistors, such as that disclosed, for example, in German patent application No. 37 18 912.3. The reverse voltages are reliably limited in much the same way as for a power Zener diode. Current peaks on the order of magnitude up to a few Amperes may thereby definitely appear. What is important is that the power dissipation produced by the limiting effect does not lead to an increase in temperature above the limit value of the avalancheproof MOS transistor.

One-time voltage peaks across the avalanche-proof MOS transistor are thus allowable in accordance with this invention, even when the power peak lies in the kilovolt-ampere (KVA) region. When, by contrast, the allowable drain-source voltage of the avalanche-proof MOS transistor is periodically exceeded at every pulse, then the transistor very quickly overheats and is destroyed by the power dissipation that occurs.

The destruction limit lies at the "Zener limit" in such avalanche proof MOS transistors such as, for example, in avalanche-proof SIPMOS transistors (SIPMOS is a registered trademark of Siemens AG, and stands for Siemens Power MOS). Even when an outage of the control loop occurs, the output voltage of the switched power pack is effectively prevented from being exceeded by more than 5 through 20% provided in the development. In a preferred development, a narrower range of 10-20% for the safety margin is provided.

The present invention represents a reliable protective mechanism for a switched power pack that can be realized without additional outlay for components. The switched power pack is particularly useful in television receivers where it prevents high voltages from reaching the picture tube in case of malfunction. This has important safety considerations since such high voltages can result in excessively high x-ray levels being emitted from the picture tube.

BRIEF DESCRIPTION OF THE DRAWINGS

FIG. 3 is a waveform diagram of the drain-source voltage of an avalanche-proof SIPMOS transistor in a switched power pack given periodic limitation.

FIG. 4 is waveform diagram of the drain-source voltage of an avalanche-proof SIPMOS transistor in a switched power pack given complete limitation.

DETAILED DESCRIPTION OF THE PREFERRED EMBODIMENTS

Figure 1:
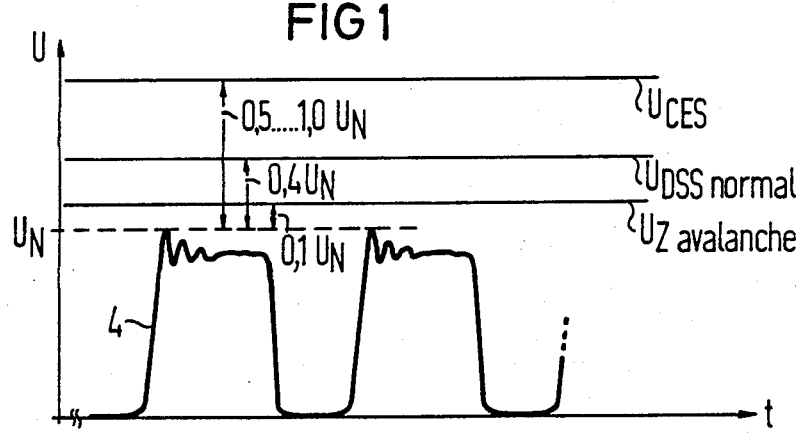
FIG. 1 is a waveform diagram of a voltage curve at the load circuit of a switching transistor in a switched power pack given normal operation in the steady state with allowable reverse voltages. The illustrated waveforms are applicable to a circuit using either a bipolar transistor, a MOS transistor or an avalanche-proof MOS transistor according to the invention.

FIG. 1 shows a typical voltage curve 4 at a load circuit for a switching transistor in a switched power pack given normal operation in the steady state. This signal occurs, for example, in a power supply to a picture tube. When a bipolar transistor is used as the switching transistor, then the curve 4 is the collector-emitter voltage $U_{CE}$ of the bipolar transistor. When, on the other hand, a MOS transistor is used as the switching transistor, then the curve 4 represents the drain-source voltage $U_{DS}$. After the switching transistor is turned off, the black compression shown in FIG. 1 occurs. Voltage level $U_N$ in FIG. 1 refers to the peak reverse voltage drop across the switching transistor during normal operations and at a specific, prescribed input voltage of the switched power pack. When an alternating voltage of 220 volts is applied at the input of the switched power pack, the voltage $U_N$ lies, for example, at 500 V.

When a bipolar transistor is used as the switching transistor in the switched power pack, then a voltage safety margin of between 50% through 100% must be provided. In other words, the permissible collector-emitter voltage $U_{CES}$ must be selected to be about 50% through 100% higher than the voltage $U_N$ appearing across the bipolar transistor during normal operation. This is illustrated in FIG. 1. This safety margin is required because a bipolar transistor is destroyed by even a one-time voltage peak which exceeds the allowable collector-emitter voltage $U_{CES}$.

Normal MOS transistors are also immediately destroyed by a one-time, short upper transgression of the allowable drain-source voltage $U_S$. Therefore, a similarly high voltage safety margin must be taken into consideration in the development of a switched power pack using MOS transistors. The voltage safety margin for a normal MOS transistor lies at about 40% of the normal operating voltage $U_N$, as shown in FIG. 1.

In accordance with the present invention, the switched power pack includes an avalanche-proof MOS transistor, and preferably an avalanche-proof SIPMOS transistor. The switched power pack, which is particularly a blocking oscillator power pack, is dimensioned so that a voltage safety margin of only about 5% through 20% is provided up to the destruction limit of the avalanche-proof SIPMOS transistor.

The Zener voltage of the avalanche-proof SIPMOS transistor is shown in FIG. 1 as voltage $U_Z$ avalanche. By referring to FIG. 1, it can be seen that the Zener voltage $U_Z$ avalanche is considerably below the allowable drain-source voltage $U_{DSS}$ normal for a normal MOS transistor and considerably below the allowable collector-emitter voltage $U_{CES}$ for a bipolar transistor.

Figure 2:
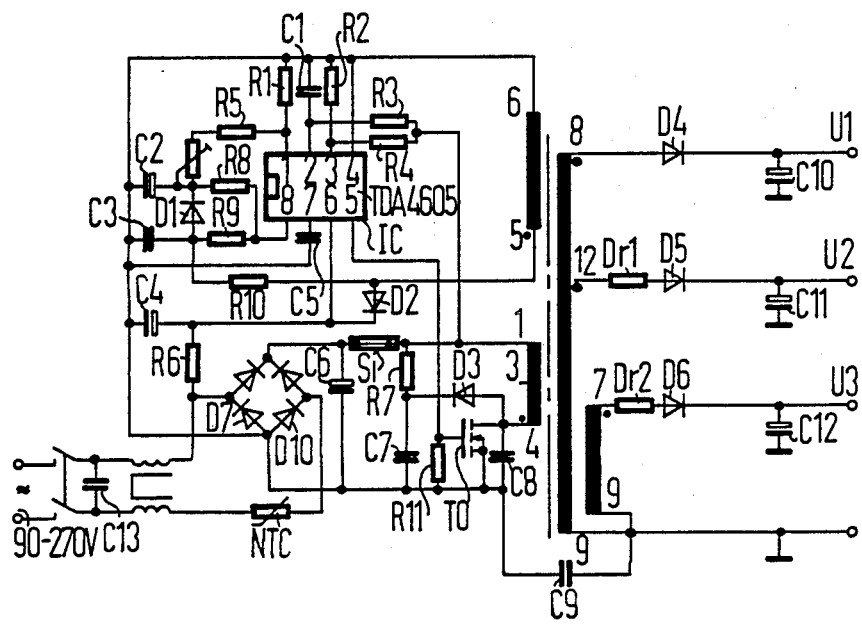
FIG. 2 is a circuit diagram of a switched power pack of the invention in including an avalanche-proof SIPMOS transistors.

In FIG. 2 is shown an exemplary embodiment of a blocking oscillator switched power pack of the invention. The switched power pack is already described in detail in product information of Siemens, "ICs Fuer die Unterhaltungselektronik, SNTs, Edition of 8.87" page 57. In contrast to the normal SIPMOS transistor BUZ 90 employed therein, an avalanche-proof SIPMOS TO transistor is employed in the present invention. The avalanche-proof SIPMOS transistor TO, is referenced, for example, under part designation BUZ 90°. The avalanche-proof SIPMOS transistor BUZ 90° has an allowable drain-source voltage of 600 V and has a Zener voltage $U_Z$ avalanche of about 630 V so that the avalanche-proof SIPMOS transistor is destroyed given continuous transgression of the 630 V limit. The switched power pack of FIG. 2 is designed for input voltages of 90 through 250 V and comprises an integrated control and monitoring means IC which is, for example, an integrated circuit TDA 4605, for driving the avalanche-proof SIPMOS transistor TO.

The circuit arrangement is also dimensioned so that a voltage safety margin of 5% through 20% is provide up to the destruction limit of the avalanche-proof SIPMOS transistor TO. This occurs by appropriate dimensioning of the transformer, such as by the turns ratio and coupling factor, and with the wiring of the feed-back circuit.

The black compression of the voltage in the switched power pack that is described above can be limited with the damping combination of diode D3, resistor R7 and capacitor C7.

Preferably, the dimensions of the components of the blocking oscillator switched power pack shown in FIG. 2 are as listed below:

| | |
|---|---|
| R1 220 Ohm | C1 3.9 nF |
| R2 8.2 kOhm | C2 1 μF |
| R3 270 kOhm | C3 1 nF |
| R4 750 kOhm | C4 47 μF/25 V |
| R5, R11 4.7 kOhm | C5 220 nF |
| R6 22 kOhm | C6 150 μF/83 V |
| R7, R9 10 kOhm | C7 33 nF |
| R8 100 kOhm | C8 270 pF |
| R10 100 Ohm | C9 2.2 nF |
| D1 1 N4148 | C10 47 μF/250 V |
| D2 1 N4148 | C11 1000 μF/25 V |
| D3, D4, BYW 76 | C12 470 μF/25 V |
| NTC S231 | D5, D6, BYW 72 |
| IC TDA 4605 | D7–D10 1 N4007 |
| TO BUZ 90* | P 2.2 kOhm |
| Transformer TD 3202 | |
| Si F 0.8 A | |

During normal operation, a rectified voltage of 124 V is at the junction of the capacitor C10 and the diode D4 at the output leads of the switched power pack, whereas a 16 V signal is applied at the junction of the diode D5 and the capacitor C11 and 9 V are applied at the junction of the diode D6 and the capacitor C12.

FIG. 3 shows a waveform 5 of a drain-source voltage across the avalanche-proof SIPMOS transistor TO of the invention given an elevated input voltage. Waveform 4 shown in broken outline refers to the drain-source voltage at normal operation. The high reverse voltage peaks that appear are limited by the avalanche-proof SIPMOS transistor, similar to the case for a power Zener diode. A high power dissipation occurs in the avalanche-proof SIPMOS transistor. When high reverse voltage peaks appear only briefly, such as in a range of minutes, the avalanche-proof SIPMOS transistor is not damaged. As already set forth in conjunction with FIG. 1, the voltage level $U_Z$ avalanche denotes the Zener voltage for the avalanche-proof SIPMOS transistor.

In FIG. 4 is shown a waveform 6 of the drain-source voltage for the avalanche-proof SIPMOS transistor TO given total limitation. The avalanche-proof SIPMOS transistor TO exhibits an extremely high power dissipation and is quickly destroyed. Even given outage of the control loop of the switched power pack, this makes it impossible for the normal output voltage to be exceeded by more than the 5% through 20% range provided in the development in the switched power pack. It thus becomes impossible for the safe limit values of x-radiation to be exceeded by the television set in which the switched power pack is used.

Figure 5:
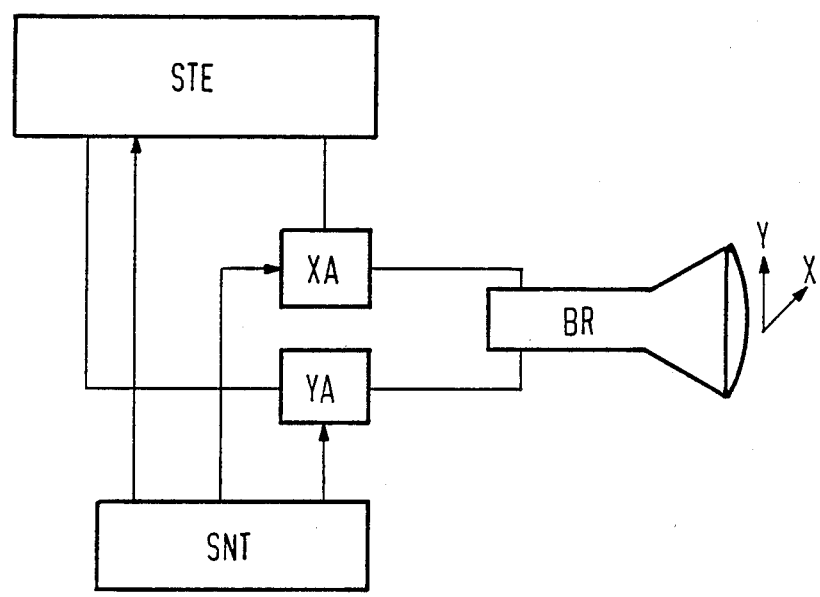
FIG. 5 is a block circuit diagram of a picture screen device including the switched power pack of the present invention.

In FIG. 5 is shown a block circuit diagram of a picture screen device including the switched power pack SNT of the present invention. The picture screen device as such is well known and comprises, for example, a picture tube BR which is connected to a first deflection unit XA and a second deflection unit YA to deflect the electron beam of the picture tube BB in the X and Y direction. the first and second deflection units XA and YA are controlled by a control unit STE which is, for example, the video unit of a television receiver. For a power supply, the picture screen device is provided with the switch power pack SNT. The switched power pack according to the present invention prevents high voltages from reaching the picture tube in case of malfunction. Therefore, no high x-ray levels are emitted from the picture tube. The switched power pack SNT is also referred to as a switched mode power supply SMPS.

It should be noted that the switched power pack of the invention is not solely limited, of course, to use in picture screen equipment. On the contrary, the circuit design presented here can be used anywhere in switched power packs where the output voltages limits dare not be exceeded, for example, in computer and like.

Although other modifications and changes may be suggested by those skilled in the art, it is the intention of the inventor to embody within the patent warranted hereon all changes and modifications as reasonably and properly come within the scope of his contribution to the art.

I claim:

1. A switched power pack having a protective device for limiting output voltage, comprising:
   a switching transistor for selectively conducting a DC voltage, the switching transistor being an avalanche-proof MOS transistor;
   means for driving said switching transistor, said driving means being dimensioned so that a voltage safety margin in the range of between 5 through 20% is provided between reliable continuous operation of the switched power pack and a destruction limit of said avalanche-proof MOS transistor; and
   a transformer having a primary winding connected to said switching transistor to receive a selectively conducted DC voltage, said transformer having a secondary winding supplying an output voltage.

2. A switched power pack as claimed in claim 1, wherein said avalanche-proof MOS transistor has a maximally allowable Zener voltage lying approximately 5% through 20% above the drain-source voltage appearing across said MOS transistor during normal operation of the switched power pack.

3. In a switched power pack having a device for limiting output voltage and a drive means for driving a switching transistor via which a DC voltage is periodically connected to a primary winding of a transformer, the transformer having at least one secondary winding at which the output voltage is obtained via a rectifier arrangement, the improvement comprising:
   the switching transistor being an avalanche-proof MOS transistor and the switched power pack having components of such dimensions that a voltage safety margin of between 5 through 20% is provided between the reliable continuous operation of the switched power pack and the destruction limit of the avalanche-proof MOS transistor.

4. A switched power pack for use in a picture screen device, comprising:
   an input for receiving input signals;
   an integrated control and monitoring device connected to receive signals from said input, said control and monitoring device having an output;
   an avalanche-proof MOS transistor having a gate lead connected to said output of said control and monitoring device, said MOS transistor having a Zener voltage level;
   electrical components connected to said control and monitoring device and to said MOS transistor, said electrical components being of such values that said Zener voltage level of said MOS transistor is between 5 through 20 percent above a normal operating level of said MOS transistor; and
   a transformer connected to said MOS transistor.

* * * * *